UNITED STATES PATENT OFFICE 2,656,367

STEROIDS AND PROCESS OF PREPARING THE SAME

Robert P. Graber, Westfield, and Norman L. Wendler, Linden, N. J., assignors to Merck & Co., Inc., Rahway, N. J., a corporation of New Jersey No Drawing. Application December 2, 1950, Serial No. 198,916

8 Claims. (Cl. 260—397.4)

This invention is concerned generally with novel steroid compounds and with processes for preparing them. More particularly, it relates to a novel process for the preparation of $\Delta^4$-3,20-diketo-11,17,21-trihydroxy-pregnene and 21-acylated derivatives thereof starting with $\Delta^{17}$-3,11-diketo-20-cyano-21-hydroxy-pregnene or 21-acyl derivatives thereof, and to the intermediate compounds utilized in this novel procedure.

The hydroxyl groupings attached to the 11 and 17-carbon atoms in the intermediate and final compounds, prepared according to our novel process, possess the same stereochemical configurations as that present in many of the naturally-occurring adrenal hormones. The configuration of the 11-hydroxyl substituent in such naturally-occurring steroids (and in the compounds prepared in accordance with our procedure) has been found to correspond to that of the two angular methyl groupings and the side chain of the steroid molecule. The 11-hydroxyl radical in such compounds is conventionally designated $\beta$, and is written above the plane of the ring system; i. e. the —OH radical is connected to the 11-carbon atom by means of a full line in the chemical formulae of these compounds. The configuration of the 17-hydroxyl substituent in these compounds has been found to be transposed to that of the two angular methyl groups and to the side chain of the steroid molecule. The 17-hydroxyl radical is conventionally designated $\alpha$, and is written below the plane of the ring system; i. e. the —OH radical is connected to the 17-carbon atom by means of a dotted line. Thus, our novel process is especially valuable in the synthesis of the natural adrenal hormone, $\Delta^4$-3,20-diketo-11($\beta$),17($\alpha$),21-trihydroxy-pregnene (otherwise known as Kendall's Compound F) which may be chemically represented as follows:

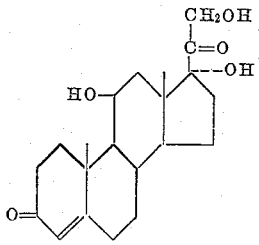

Although $\Delta^4$-3,11,20-triketo-17($\alpha$)-hydroxy-21-dihydroxypregnene, commonly known as cortisone, and its 21-acyl derivatives have been prepared heretofore by chemical synthesis, the preparation of Compound F, or of other cortical steroids hydroxylated at position 11, utilizing, as starting material, cortisone, or other 11-keto-10,13-dimethyl-cyclopentanopolyhydrophenanthrene compounds obtained as intermediates in the synthesis of cortisone, such as $\Delta^{17}$-3,11-diketo-20-cyano-21-hydroxypregnene, has previously encountered an apparently insurmountable obstacle by virtue of the following chemical facts: (1) The polyfunctional character of this class of steroids and the fact that such steroids ordinarily possess additional keto substituents in the 3 and/or 20-positions of the molecule; (2) The extremely low reactivity (ascribed to steric hindrance) of the 11-keto substituent; and (3) the known susceptibility of the $\beta$-hydroxyl group at position 11 to oxidation and elimination reactions, together with the seemingly anomalous inertness of the 11($\beta$)-hydroxyl to acylating agents.

Thus, when an 11-keto-10,13-dimethyl-cyclopentanopolyhydrophenanthrene compound containing additional keto substituents in the 3 and/or 20-positions is reduced utilizing conventional methods of hydrogenation or chemical reduction, it has been found that reduction of the keto radicals in the 3 and/or 20-positions takes place preferentially to the reduction of the 11-ketone. Only by employing relatively drastic reduction conditions, is it possible to reduce the 11-keto substituent and, under such drastic conditions of reduction, the 3 and/or 20-keto groupings are likewise reduced. The compounds thus obtained, in attempted syntheses of cortical steroids are 10,13-dimethyl-cyclopentanopolyhydrophenanthrenes containing an 11($\beta$)-hydroxy radical and additional hydroxy radicals in the 3 and/or 20-positions of the molecule. Attempts to convert these 3 and/or 20-hydroxy radicals by reaction with oxidizing agents to the corresponding keto substituents, while retaining the $\beta$-hydroxy radical attached to the 11-carbon atom, have not been satisfactory due to the comparatively high susceptibility of the 11($\beta$)-hydroxy grouping to oxidation. Anomalously, it has not been possible to "protect" the 11($\beta$)-hydroxy group by acylation while leaving the 3 and/or 20-hydroxy radicals free to be oxidized, since the 11($\beta$)-hydroxyl group is subject to very pronounced steric hindrance and has resisted acylation by all methods tried (see page 408 of the next "Natural Products Related to Phenanthrene" by Fieser and Fieser, 3rd edition, Rheinhold Publishing Corp., New York, New York, 1949).

We have now discovered that $\Delta^4$-3,20-diketo-11($\beta$),17($\alpha$),21-trihydroxy-pregnene or its 21-acyl derivatives can be prepared, starting with $\Delta^{17}$-3,11-diketo-20-cyano-21-hydroxy-pregnene, or its 21-acyl derivatives, by a novel procedure which is conducted as follows: $\Delta^{17}$-3,11-diketo-20-cyano-21-hydroxy-pregnene, or a 21-acyl derivative thereof (Compound 1 hereinbelow) is reacted with a ketone reagent, such as hydroxylamine, semicarbazide, arylhydrazines, alkyl orthoformates, and the like, whereby the keto radical in the 3-position is replaced by an azomethine radical or by a dialkyl ketal grouping. The resulting $\Delta^{17}$-3-(oximino, semicarbazido or arylhydrazino)-11-keto-20-cyano-21-(hydroxy or acyloxy)-pregnene (Compound 2) or $\Delta^{17}$ - 3,3 - dialkoxy - 11 - keto - 20 - cyano - 21-(hydroxy or acyloxy)-pregnene (Compound 3) is then reacted with an alkali metal borohydride whereby the keto grouping attached to the 11-carbon atom of these compounds is converted to an 11($\beta$)-hydroxy substituent without substantially affecting the unsaturated carbon nitrogen linkages in the 20-cyano substituent, and without affecting the azomethine or ketal grouping in the 3-position of the molecule, thereby producing $\Delta^{17}$-3-(oximino, semicarbazido or arylhydrazino)-11($\beta$)-hydroxy-20-cyano-21-(hydroxy or acyloxy)-pregnene (Compound 4) or $\Delta^{17}$-3,3-dialkoxy-11($\beta$)-hydroxy-20-cyano-2-(hydroxy or acloxy)-pregnene (Compound 5). The resulting $\Delta^{17}$-11($\beta$)-hydroxy-20-cyano-21-(hydroxy or acyloxy)-pregnene compound containing an azomethine or ketal grouping in the 3-position is reacted with a hydrolyzing agent, whereby the azomethine radical or ketal grouping is converted to a ketone thereby forming $\Delta^{17}$-3-keto-11($\beta$)- hydroxy - 20 - cyano-21 - (hydroxy or acyloxy)-pregnene (Compound 6). When the compound thus obtained is the $\Delta^{17}$-3-keto-11($\beta$),21-dihydroxy-20-cyano-pregnene, it is converted, by reaction with a lower aliphatic carboxylic acid anhydride, to the corresponding 21-acyl derivative, $\Delta^{17}$ - 3 - keto - 11($\beta$) - hydroxy - 20 - cyano - 21-acyloxy pregnene. The resulting $\Delta^{17}$-3-keto-11($\beta$)-hydroxy-20-cyano-21-acyloxy-pregnene is then reacted with osmium tetroxide thereby producing the 17,20-osmate ester of 3-keto-11($\beta$),17-($\alpha$),20 - trihydroxy - 20 - cyano - 21 - acyloxypregnane (Compound 7) which is then reacted with a hydrolyzing agent to form 3,20-diketo-11($\beta$),17($\alpha$) - dihydroxy - 21 - acyloxy - pregnane (Compound 8). The latter compound is then reacted with bromine to form 3,20-diketo-4-bromo - 11($\beta$),17($\alpha$) - dihydroxy - 21 - acyloxypregnane (Compound 9) which is reacted with a dehydrohalogenating agent to form $\Delta^4$-3,20-diketo - 11($\beta$),17($\alpha$) - dihydroxy - 21 - acyloxypregnene (Compound 10). This compound is reacted with a hydrolyzing agent to produce $\Delta^4$-3,20 - diketo - 11($\beta$),17($\alpha$),21 - trihydroxy - pregnene, also known as Compound F (Compound 11). The reactions indicated hereinabove may be chemically represented as follows:

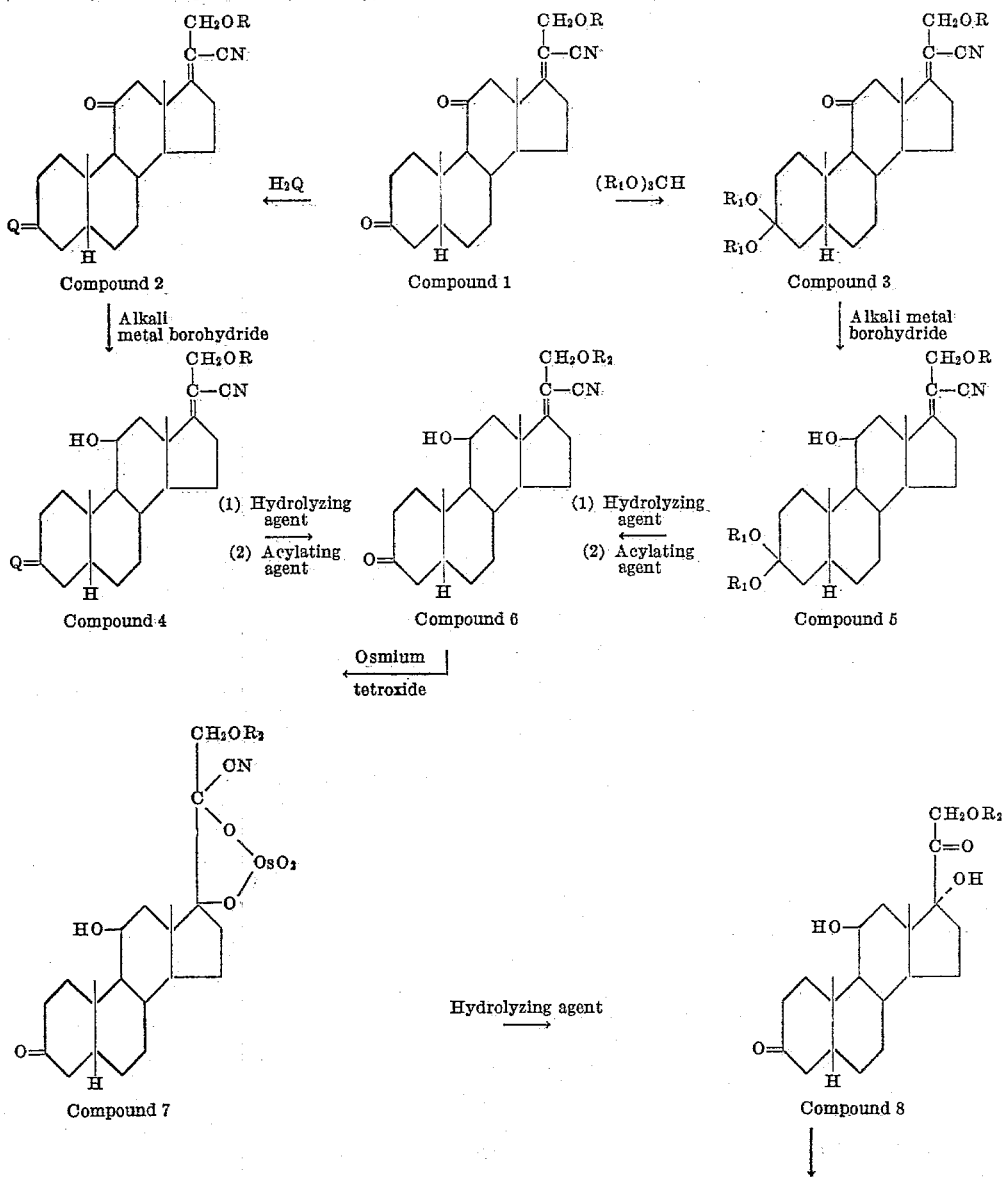

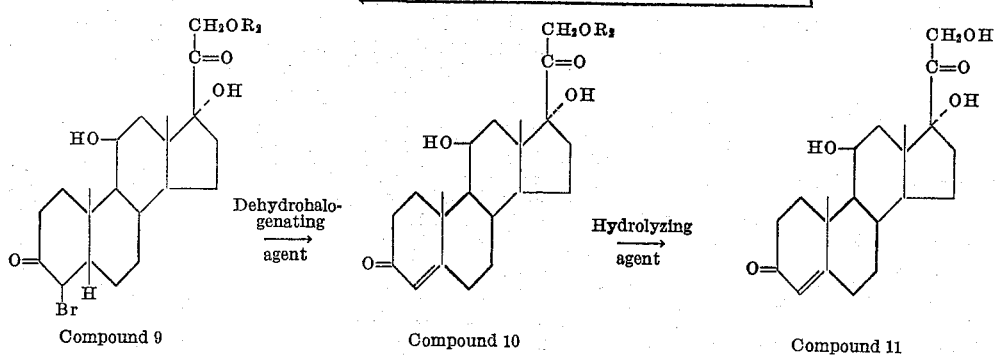

Compound 9     Compound 10     Compound 11 wherein R is hydrogen or an acyl radical, $R_1$ is an alkyl radical, $R_2$ is an acyl radical, and Q is an oximino, semicarbazido or arylhydrazino radical.

In carrying out our novel process, $\Delta^{17}$-3,11-diketo-20-cyano-21-hydroxy-pregnene, or a 21-acyl derivative thereof such as $\Delta^{17}$-3,11-diketo-20-cyano-21-acetoxy-pregnene, $\Delta^{17}$-3,11-diketo-20-cyano-21-propionoxy-pregnene, $\Delta^{17}$-3,11-diketo-20-cyano-21-benzoxy-pregnene, and the like, is reacted with a ketone reagent, such as hydroxylamine, semicarbazide, an arylhydrazine, an alkyl orthoformate, and the like, to produce the corresponding $\Delta^{17}$-11-keto-20-cyano-21-(hydroxy or acyloxy)-pregnene containing in the 3-position an azomethine or ketal radical. Where the ketone reagent used is hydroxylamine, semicarbazide or arylhydrazine, the compound obtained can be represented by the formula:

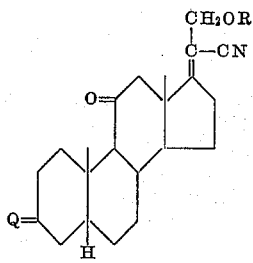

wherein R is hydrogen or acyl, and Q is an oximino, semicarbazido, or arylhydrazino radical. Where the ketone reagent utilized is an alkyl orthoformate, such as ethyl orthoformate, methyl orthoformate and the like, there is obtained a compound of the formula:

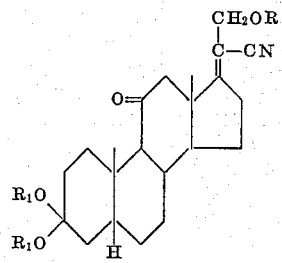

wherein $R_1$ is an alkyl radical, and R has the significance hereinabove defined.

The reaction between the $\Delta^{17}$-3,11-diketo-20-cyano-21-(hydroxy or acyloxy)-pregnene and hydroxylamine, semicarbazide or arylhydrazine is conveniently conducted by bringing the reactants together in the presence of a solvent, such as water, acetic acid, alcohol, and the like. The ketone reagent is conveniently prepared by bringing together in the reaction mixture a salt of the ketone reagent, such as hydroxylamine hydrochloride, semicarbazide hydrochloride, and the like, and an alkaline material such as sodium acetate, pyridine, and the like. The mixture of $\Delta^{17}$-3,11-diketo-20-cyano-21-(hydroxy or acyloxy)-pregnene, ketone reagent, and solvent is ordinarily heated, preferably at a temperature of about 70° C., for a period of two to three hours, thereby forming the $\Delta^{17}$-3-(oximino, semicarbazido or arylhydrazino) - 11 - keto - 20 - cyano-21 (hydroxy or acyloxy)-pregnene. This product is conveniently recovered by evaporating the reaction mixture to small volume, and diluting the solution with water, whereupon the desired product crystallizes and can be recovered by filtration.

The reaction involving an alkyl orthoformate and $\Delta^{17}$ - 3,11 - diketo - 20 - cyano - 21 - (hydroxy or acyloxy)-pregnene, is conveniently carried out by bringing the reactants together in the presence of a substantially anhydrous solvent as, for example, benzene in the presence of a mineral acid. We ordinarily conduct the reaction employing ethyl orthoformate in solution in benzene containing absolute ethyl alcohol and a small amount of sulfuric acid. It is preferred to employ a temperature of approximately 70–75° C. under which conditions the reaction is substantially complete in approximately two hours. The ketal thus produced is conveniently recovered from the reaction solution by first shaking the solution with an aqueous alkaline solution to neutralize the acidic catalyst, followed by evaporation of the organic layer whereby the desired $\Delta^{17}$-3,3-dialkoxy-11-keto-20-cyano-21-(hydroxy or acyloxy)-pregnene is obtained in the form of an amorphous solid.

The $\Delta^{17}$-11-keto-20-cyano-21-(hydroxy or acyloxy)-pregnene compound containing in the 3-position an azomethine or ketal substituent, is then reacted with an alkali metal borohydride, such as lithium borohydride, sodium borohydride, and the like, whereby the keto substituent in the 11-position is converted to an 11($\beta$)-hydroxyl radical without substantially affecting the unsaturated carbon-nitrogen linkages in the cyano radical attached to the 20-carbon atom, and without substantially affecting the azomethine or ketal grouping in the 3-position. (The fact that the carbon-nitrogen linkages in the molecule are not appreciably affected by the alkali metal borohydride reducing agent is indeed surprising since other reducing agents, such as lithium aluminum hydride, reduce cyano radicals and azomethine groupings to the corresponding amines.) The compound thus produced is the corresponding $\Delta^{17}$-11($\beta$)-hydroxy-20-cyano-21-(hydroxy or acyloxy)-pregnene compound containing in the 3-position an azomethine or ketal grouping. These compounds may be chemically represented as follows:

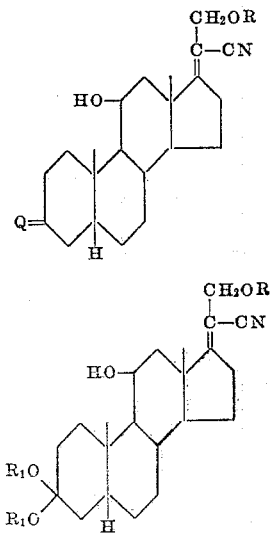

wherein R, R₁ and Q have the significance hereinabove defined.

The reaction between the $\Delta^{17}$-11-keto-20-cyano-21-(hydroxy or acyloxy)-pregnene compound and the alkali metal borohydride is ordinarily carried out by bringing the reactants into intimate contact in the presence of a diluent, preferably in the presence of a solvent such as tetrahydrofuran, dimethylformamide, diethyl ether, and the like. It is ordinarily preferred to carry out the reaction by adding a tetrahydrofuran solution of the $\Delta^{17}$-11-keto-20-cyano-21-(hydroxy or acyloxy)-pregnene compound to a solution of the alkali metal borohydride in tetrahydrofuran. This addition of the 11-keto compound to the reducing agent is preferably conducted portionwise, while maintaining the temperature of the reaction mixture at approximately 25° C. However, with the more active alkali metal borohydride (e. g. lithium borohydride), the reaction can be carried out at a lower temperature with lengthening of the reaction time. Conversely, with the less active sodium borohydride, a higher temperature may be necessary, it ordinarily being preferred to conduct the reaction, when using sodium borohydride as the reducing agent, at a temperature of about 60-70° C. Thus, although it is ordinarily preferred to maintain the reaction temperature at about 25° C., it may be preferred to employ somewhat lower temperatures down to 0° C., when using lithium borohydride, as well as higher temperatures up to 70° C., when using sodium borohydride. When the reaction is carried out using lithium borohydride at a temperature of about 25° C., the reaction is ordinarily substantially complete in less than approximately one hour. When the reaction is carried out using sodium borohydride at the preferred temperature for this reducing agent of about 65° C., the reaction is substantially complete in less than 24 hours.

The resulting $\Delta^{17}$-11($\beta$)-hydroxy-20-cyano-21-(hydroxy or acyloxy)-pregnene compound containing in the 3-position an azomethine or ketal grouping is recovered from the reaction mixture by conventional means. This is ordinarily accomplished by cautiously acidifying the reaction mixture, preferably utilizing aqueous acetic acid, thereby decomposing excess alkali metal borohydride. The $\Delta^{17}$-11($\beta$)-hydroxy-20-cyano-21-(hydroxy or acyloxy)-pregnene compound can then be recovered by evaporating the reaction mixture to a small volume, preferably in vacuo, and diluting the concentrate with water. The product which separates, frequently in the form of an oil, can then be extracted from this aqueous mixture utilizing conventional water-immiscible solvents such as benzene, ether, chloroform, ethyl acetate and the like. The extract of $\Delta^{17}$-11($\beta$)-hydroxy-20-cyano-21-(hydroxy or acyloxy)-pregnene compound is then purified by conventional means, as for example, by washing successively with water and dilute aqueous alkaline solution, followed by drying. The product is recovered from the extract by evaporating the solvent therefrom, and can be further purified by recrystallization from solvents such as aqueous acetone, benzene, and the like. Where recrystallization from an organic solvent alone is insufficient to accomplish purification, it has been found convenient to subject the extract to a preliminary chromatographic fractionation utilizing activated alumina as the adsorbent.

The $\Delta^{17}$-11($\beta$)-hydroxy-20-cyano-21-(hydroxy or acyloxy)-pregnene compound containing in the 3-position an azomethine or ketal grouping is then reacted with an acidic hydrolyzing agent, thereby producing $\Delta^{17}$-3-keto-11($\beta$),21-dihydroxy-20-cyano-pregnene or a 21-acyl derivative thereof such as $\Delta^{17}$-3-keto-11($\beta$)-hydroxy-20-cyano-21-acetoxy-pregnene, $\Delta^{17}$-3-keto-11($\beta$)-hydroxy-20-cyano-21-propionoxy pregnene, $\Delta^{17}$-3-keto-11($\beta$)-hydroxy-20-cyano-21-benzoxy-pregnene, and the like. In the case of $\Delta^{17}$-11($\beta$)-hydroxy-20-cyano-21-(hydroxy or acyloxy)-pregnene compounds containing a 3-azomethine substituent, it is common to conduct the hydrolysis under acid conditions in the presence of a carbonyl acceptor, as for example, pyruvic acid, benzoyl formic acid, and the like. The hydrolysis reaction is conveniently carried out by heating the mixture of reactants at an elevated temperature of about 75° C. under which conditions the hydrolysis reaction is ordinarily substantially complete in approximately 4 hours. In the case of $\Delta^{17}$-11($\beta$)-hydroxy-20-cyano-21-(hydroxy or acyloxy)-pregnene compounds containing a 3-ketal grouping, the reaction is conveniently carried out by allowing the pregnene compound to stand in solution in the presence of a mineral acid, such as aqueous hydrochloric acid, aqueous sulfuric acid, and the like, at a temperature of approximately 25° C. for a period of about 15-20 hours. The $\Delta^{17}$-3-keto-11($\beta$)-hydroxy-20-cyano-21-(hydroxy or acyloxy)-pregnene obtained by either of the foregoing hydrolysis procedures, is recovered from the hydrolysis mixture by conventional means as, for example, by evaporating said mixture in vacuo and extracting the concentrate containing $\Delta^{17}$-3-keto-11($\beta$)-hydroxy-20-cyano-21-(hydroxy or acyloxy)-pregnene with a solvent such as ethyl acetate.

Although either $\Delta^{17}$-3-keto-11($\beta$),21-dihydroxy-20-cyano-pregnene or its 21-acyl derivative can be used in the subsequent reaction with osmium tetroxide, it is ordinarily preferred to utilize the $\Delta^{17}$-3-keto-11($\beta$)-hydroxy-20-cyano-21-acyloxy-pregnene in this reaction. The $\Delta^{17}$-3-keto-11($\beta$),21-dihydroxy-20-cyano-pregnene is preferably converted to its 21-acyl derivative by reaction with an acylating agent. It is ordinarily preferred to utilize, as the acylating agent for this reaction, a lower aliphatic carboxylic acid anhydride such as acetic anhydride, propionic anhydride, and the like, and to carry out the reaction in the presence of a tertiary organic amine such as pyridine.

The $\Delta^{17}$-3-keto - 11 ($\beta$) -hydroxy-20-cyano-21-acyloxy-pregnene is then treated with osmium tetroxide, preferably in the presence of an organic solvent such as pyridine, thereby forming the 17,20-osmate ester of the corresponding 3-keto-11($\beta$),17($\alpha$),20-trihydroxy-20-cyano-21-acyloxy-pregnane, such as the 17,20-osmate ester of 3-keto-11($\beta$),17($\alpha$),20-trihydroxy-20-cyano-21-acetoxy-pregnane, the 17,20-osmate ester of 3-keto-11($\beta$),17($\alpha$), 20-trihydroxy-20-cyano-21-propionoxy-pregnane, the 17,20-osmate ester of 3-keto-11($\beta$),17($\alpha$),20-trihydroxy-20-cyano-21-benzoxy-pregnane, and the like. The 17,20-osmate ester of the 3-keto-11 ($\beta$), 17 ($\alpha$), 20-trihydroxy-20-cyano-21-acyloxy-pregnane, prepared as described above, is then reacted with a hydrolyzing agent. Instead of isolating the osmate ester, the reaction solution obtained from the osmylation reaction may be used, after neutralization, in this hydrolysis operation. The hydrolysis reaction can be carried out utilizing, as the hydrolyzing agent, either an aqueous alkaline solution containing a reducing agent, as for example an aqueous alkaline solution of formaldehyde, an aqueous alkaline solution of ascorbic acid, an aqueous alkaline solution of mannitol, an aqueous alkaline solution of an alkali metal sulfite such as sodium sulfite, and the like, or if desired, an aqueous solution of a mineral acid such as hydrochloric acid, and the like. The preferred hydrolyzing agent comprises aqueous sodium sulfite and sodium bicarbonate, and the hydrolysis reaction is conveniently carried out at room temperature. Under these preferred hydrolysis conditions, the reaction is ordinarily substantially complete in approximately 15–20 hours. The reaction mixture is filtered, evaporated to small volume and extracted with an organic solvent such as chloroform and the like. The organic solvent extract is then evaporated to dryness to produce the 3,20-diketo-11 ($\beta$), 17 ($\alpha$)-dihydroxy-21-acyloxy-pregnane.

The 3,20 - diketo - 11($\beta$),17($\alpha$) - dihydroxy-21-acyloxy-pregnene is then reacted with bromine, preferably in the presence of acetic acid, thereby producing the corresponding 3,20-diketo-4 - bromo - 11($\beta$),17($\alpha$) - dihydroxy - 21 - acyloxy-pregnane. This compound is conveniently recovered from the reaction mixture by diluting the same with water and extracting the resulting suspension with an organic solvent such as chloroform. The organic solvent extract is washed with water, evaporated to dryness and the residual material is purified by recrystallization from a solvent as, for example, an organic solvent mixture such as acetone-ether.

The 3,20 - diketo - 4 - bromo - 11($\beta$),17($\alpha$)-dihydroxy-21-acyloxy-pregnane is then reacted with a dehydrohalogenating agent, such as pyridine, or semicarbazide followed by aqueous pyruvic acid, whereby the elements of hydrogen bromide are removed from the molecule to produce the corresponding $\Delta^4$-3,20-diketo-11($\beta$), 17($\alpha$)-dihydroxy-21-acyloxy-pregnene, as for example, $\Delta^4$-3,20-diketo-11($\beta$),17($\alpha$)-dihydroxy-21-acetoxy-pregnene, $\Delta^4$-3,20-diketo-11($\beta$),17($\alpha$)-dihydroxy-21-propionoxy-pregnene, and the like. The dehydrohalogenation reaction, where pyridine is employed, is conveniently carried out by heating the reaction mixture under reflux for a period of approximately 5 hours. The pyridine is then evaporated under reduced pressure, the residual material is dissolved in an organic solvent such as chloroform, and the organic solvent extract is washed with dilute aqueous acid solution (to remove residual pyridine) and then with water. The organic solvent extract is then evaporated under reduced pressure, and the residual material purified by recrystallization from a solvent such as a lower aliphatic alcohol to produce, in substantially pure form, the corresponding $\Delta^4$-3,20-diketo-11($\beta$),17($\alpha$)-dihydroxy-21-acyloxy-pregnene. Alternatively, the dehydrohalogenation is conveniently carried out by reacting the 3,20-diketo-4-bromo-11($\beta$),17($\alpha$)-dihydroxy-21-acyloxy-pregnane with semicarbazide, which reaction is preferably conducted by heating the reactants together in acetic acid solution for a period of approximately 2 hours. The reaction mixture is then cooled, and a mixture of anhydrous sodium acetate and aqueous pyruvic acid is added to the cooled mixture. The resulting mixture is heated to a temperature of 70° C. for a period of 4 hours. The product contained in the reaction mixture is conveniently recovered by diluting the reaction mixture with water and evaporating the mixture under reduced pressure to a small volume, whereupon the product crystallizes therefrom and can be recovered by filtration to give the desired $\Delta^4$-3,20-diketo - 11($\beta$),17($\alpha$) - dihydroxy - 21 - acyloxy-pregnene.

The following examples illustrate methods of carrying out the present invention, but it is to be understood that these examples are given for purposes of illustration and not of limitation.

*Example 1*

A mixture of 35.5 g. of $\Delta^{17}$-3,11-diketo-21-hydroxy-20-cyano-pregnene, 22.2 g. of ethyl orthoformate, 0.69 g. of absolute ethyl alcohol, 200 ml. of sodium-dried benzene and 10 drops of concentrated sulfuric acid was heated with occasional agitation at a temperature of 70–75° C. for a period of approximately 2 hours. The resulting light-brown benzene reaction solution was cooled to room temperature and 5 g. of solid sodium bicarbonate was added followed by 150 ml. of a 5% aqueous solution of sodium bicarbonate. The mixture was shaken vigorously, and the aqueous layer was separated from the benzene solution. The aqueous layer was then extracted with two 85 ml. portions of ether, and the ether extracts were combined with the benzene solution. The combined benzene-ether solution was washed with two 100 ml. portions of water, one 100 ml. portion of saturated aqueous sodium chloride solution and then dried over 10 g. of anhydrous magnesium sulfate. The solvents were then evaporated in vacuo from the dry benzene-ether solution to give 45.5 g. of $\Delta^{17}$-3,3-diethoxy - 11 - keto - 20 - cyano - 21 - hydroxy-pregnene, which was obtained in the form of a fluffy, pale-yellow, amorphous solid; the infrared absorption spectrum (chloroform solution) showed the principal bands at 2.85 m$\mu$ (—OH), 4.57 m$\mu$ (—C≡N), 5.83 m$\mu$ (>C=O), 6.08 m$\mu$ (>C=C<) and $$9.18\ m\mu\ (> C-O-)$$

the ultraviolet absorption spectrum exhibited $$\lambda^{CH_3OH}_{max.} 2230\ \text{Å}., E^{1\%}_{1\,cm.}\ 364$$

*Example 2*

45 g. of $\Delta^{17}$-3,3-diethoxy-11-keto-20-cyano-21-hydroxy-pregnene, obtained as described hereinabove, was dissolved in 300 ml. of dry tetrahydrofuran (dried over metallic sodium) and this solution was added, dropwise, with agitation over a ½ hour period, to a solution of 9.7 g. of lithium borohydride in 300 ml. of dry tetrahydrofuran, while maintaining the temperature of the mixture at approximately 25° C. The resulting mixture was stirred for an additional period of 20 minutes at a temperature of 25° C., and was then cooled and stirred for 10 minutes at about 5° C. Six hundred milliliters of aqueous acetic acid containing 120 ml. of glacial acetic acid was added cautiously, with stirring, to the resulting mixture whereupon a vigorous evolution of gas occurred. The resulting mixture was evaporated in vacuo to a volume of approximately 600 ml., and the concentrated solution was then diluted with approximately 600 ml. of water. The oily organic layer which separated was extracted from the mixture utilizing 600 ml. of a 5:1 benzene-ether mixture followed by two 200 ml. portions of benzene. The combined benzene-ether extracts were washed with two 200 ml. portions of water, one 200 ml. portion of 5% aqueous sodium bicarbonate solution, and one 200 ml. portion of saturated aqueous sodium chloride solution. The washed benzene-ether extract was then dried over 30 g. of anhydrous magnesium sulfate, the dry solution was filtered, and the solvents were evaporated therefrom in vacuo to give 40.1 g. of crude $\Delta^{17}$-3,3-diethoxy-11($\beta$),21-dihydroxy-20-cyano-pregnene which was obtained in the form of a fluffy, pale-yellow, amorphous solid.

Example 3

40.1 g. of crude $\Delta^{17}$-3,3-diethoxy-11($\beta$),21-dihydroxy-20-cyano-pregnene, prepared as described hereinabove, was dissolved in a mixture of 425 ml. of acetone and 55 ml. of water. To this solution was added 4.0 ml. of 2.5 N aqueous hydrochloric acid, and the resulting solution was allowed to stand at room temperature for a period of about 30 hours. 25 ml. of 5% aqueous sodium bicarbonate solution was then added to the reaction mixture, and the resulting solution was evaporated in vacuo to a small volume, thereby evaporating substantially all of the acetone present in the solution; during this evaporation, a pale-yellow oil separated. The residual material was diluted with 800 ml. of water, and the oily organic material was extracted from the aqueous mixture utilizing one 400 ml. portion and two 300 ml. portions of chloroform. The combined chloroform extracts were washed successively with one 300 ml. portion of 5% aqueous sodium bicarbonate solution and one 300 ml. portion of water, and the washed chloroform extracts were then dried over 15 g. of anhydrous magnesium sulfate. The dry chloroform was filtered and the chloroform evaporated in vacuo to give 38.8 g. of crude $\Delta^{17}$-3-keto-11($\beta$),21-dihydroxy-20-cyano-pregnene which was obtained in the form of a pale, buff-colored, partly crystalline solid. This crude material, after one recrystallization from aqueous acetone, gave 15.3 g. of substantially pure $\Delta^{17}$-3-keto-11($\beta$),21-dihydroxy-20-cyano-pregnene which was obtained in the form of colorless needles; M. P. 216.5–218.5° C. (melted partly at 206° C., then resolidified). An analytically pure sample obtained by several recrystallizations from aqueous acetone melted at 217.5–221.5° C. (melted partly at 207–210° C., then solidified); $[\alpha]_D^{25°}$ C.$=+24.4°$ (1.03 in acetone);

$\lambda_{max.}^{CH_3OH}$ 2230 Å., $E_{1\,cm.}^{1\%}$ 387

Analysis.—Calc'd for $C_{22}H_{31}O_3N$: C, 73.91; H, 8.74. Found: C, 74.12; H, 8.73.

Example 4

2.32 g. of $\Delta^{17}$-3,3-diethoxy-11-keto-20-cyano-21-hydroxy-pregnene was dissolved in 20 ml. of tetrahydrofuran, and to this solution was added a solution of 0.84 g. of sodium borohydride in 10 ml. of tetrahydrofuran, 10 ml. of water and 0.2 ml. of 2.5 N aqueous sodium hydroxide. The mixture was heated under reflux for a period of approximately 20 hours. The reaction mixture was then cooled to room temperature, and 35 ml. of 10% aqueous acetic acid was added to the cooled mixture thereby decomposing excess sodium borohydride.

The resulting clear, colorless solution was evaporated in vacuo to a volume of about 40–50 ml., and the pale-yellow oil which separated was extracted with three 50 ml. portions of ethyl acetate. The ethyl acetate extracts were combined and the resulting ethyl acetate solution was washed successively with two 50 ml. portions of water, with two 50 ml. portions of 5% aqueous sodium bicarbonate solution, with one 50 ml. portion of water, and with one 50 ml. portion of saturated aqueous sodium chloride solution. The washed ethyl acetate solution was dried over 5 g. of anhydrous magnesium sulfate, the solution was filtered, and the solvent was evaporated therefrom in vacuo to give 1.985 g. of $\Delta^{17}$-3,3-diethoxy - 11($\beta$),21-dihydroxy-20 - cyano - pregnene which was obtained in the form of a pale, buff-colored, amorphous solid.

This material was dissolved in 25 ml. of acetone, and to this solution was added 5 ml. of water and 0.2 ml. of 2.5 N aqueous hydrochloric acid. This solution was allowed to stand at room temperature for a period of approximately 20 hours, 5.0 ml. of 5% aqueous sodium bicarbonate solution and 20 ml. of water were added thereto, and the resulting solution was evaporated in vacuo to a small volume, thereby removing the major portion of the acetone. The buff-colored oil which separated was extracted with one 50 ml. portion and two 30 ml. portions of ethyl acetate. The ethyl acetate extracts were combined and the ethyl acetate solution was washed successively with two 40 ml. portions of water, with one 40 ml. portion of 5% aqueous sodium bicarbonate solution, with one 40 ml. portion of water, and with one 40 ml. portion of saturated aqueous sodium chloride solution. The washed ethyl acetate solution was dried over 5 g. of anhydrous magnesium sulfate, the solution was filtered, and the ethyl acetate was evaporated therefrom in vacuo to give a partly crystalline pale, buff-colored residue weighing 1.705 g. This material was recrystallized from acetone to give 0.73 g. of substantially pure $\Delta^{17}$-3-keto-11($\beta$),21-dihydroxy-20-cyano-pregnene which was obtained in the form of rosettes of heavy colorless needles; M. P. 215–218° C. with softening at 213° C. (partly melted at 203–206° C., then resolidified); no depression in melting point was observed when this material was mixed with $\Delta^{17}$-3-keto-11($\beta$),21-dihydroxy - 20 - cyano-pregnene prepared as described in Example 3.

Example 5

Twenty grams of $\Delta^{17}$-3,11-diketo-20-cyano-21-hydroxy-pregnene was dissolved in 300 ml. of glacial acetic acid and to this solution was added a solution containing 12.55 g. of semi-carbazide hydrochloride and 12.55 g. of anhydrous sodium acetate dissolved in 28 ml. of water and 28 ml. of glacial acetic acid; the latter solution was rinsed into the reaction mixture with an additional 44 ml. of glacial acetic acid. The resulting mixture was heated to a temperature of 65–70° C. for a period of approximately 2½ hours during which time a small amount of crystalline material separated. The resulting suspension was evaporated in vacuo to a thick slurry of crystalline solid, and 200 ml. of water was added to said slurry. The resulting aqueous mixture was agitated vigorously to suspend caked material, the slurry was then filtered and the crystalline product washed twice with water to give 24.2 g. of colorless needles which melted at 225–230° C. with evolution of gas. One recrystallization of this product from methanol-chloroform afforded 20.2 g. of substantially pure $\Delta^{17}$-3-semicarbazido-11-keto-20-cyano-21-hydroxy-pregnene; M. P. 238–240° C. (vigorous evolution of gas). This product was further purified by repeated recrystallization from methanol-chloroform and the product dried at 140° C. to give analytically pure $\Delta^{17}$-3-semicarbazido-11-keto-20-cyano-21-hydroxy-pregnene; M. P. 244–245° C. (evolution of gas).

Analysis.—Calc'd for $C_{23}H_{32}O_3N_4$: N, 13.58. Found: N, 13.47.

Example 6

12.36 g. of $\Delta^{17}$-3-semicarbazido-11-keto-20-cyano-21-hydroxy-pregnene (M. P. 238–240° C.) was dissolved in 1500 ml. of dry tetrahydrofuran (dried over metallic sodium), and this solution was added, with stirring, over a period of approximately ½ hour, to a solution of 4.36 g. of lithium borohydride in 200 ml. of dry tetrahydrofuran, while maintaining the temperature of the mixture at approximately 25° C. The resulting mixture was stirred for an additional period of 20 minutes at a temperature of 25° C., and was then cooled and stirred for 10 minutes at about 5° C. Four hundred and fifty milliliters of aqueous acetic acid containing 51.5 ml. of glacial acetic acid was added cautiously, with stirring, to the resulting mixture, and the clear, colorless reaction mixture was evaporated in vacuo under a nitrogen atmosphere to a volume of approximately 400 ml. The colorless oily organic material which separated was extracted from the mixture utilizing one 350 ml. portion of chloroform and two 150 ml. portions of chloroform. The combined chloroform extracts were washed with two 250 ml. portions of water, and with one 200 ml. portion of 5% aqueous sodium bicarbonate solution, and the washed chloroform extracts were dried over 10 g. of anhydrous sodium sulfate. The dry chloroform solution was then filtered and the chloroform evaporated to give 11.5 g. of crude $\Delta^{17}$-3-semicarbazido-11($\beta$),21 - dihydroxy - 20 - cyano - pregnene which was obtained in the form of a gummy, buff-colored solid.

4.5 grams of this material was mixed with 15 ml. of glacial acetic acid, 7.5 ml. of water, 9.05 g. of anhydrous sodium acetate and 9.0 ml. of 90% pyruvic acid, and the mixture was heated at a temperature of 80° C. in an atmosphere of nitrogen for a period of about 3 hours. The reaction mixture was cooled to room temperature, an additional 0.9 ml. of 90% pyruvic acid was added thereto, and the resulting mixture was heated under nitrogen at a temperature of 80° C. for an additional one-hour period. The resulting mixture was allowed to stand overnight at room temperature whereupon a considerable quantity of crystalline material separated. One hundred and eighty milliliters of water was added to this mixture, and the organic material was extracted therefrom utilizing one 80 ml. portion and three 35 ml. portions of chloroform. The combined chloroform extracts were washed with two 50 ml. portions of water, two 50 ml. portions of 5% aqueous sodium bicarbonate solution, again with 50 ml. of water, and the washed chloroform solution was then dried over 5 g. of anhydrous magnesium sulfate. The dry chloroform solution was then filtered and the solvent was evaporated from the filtrate in vacuo to give 4.25 g. of partly crystalline, light, buff-colored material. This product, after one-recrystallization from acetone, afforded 1.75 g. of substantially pure $\Delta^{17}$-3-keto-11($\beta$),21-dihydroxy-20-cyano-pregnene; which was obtained in the form of colorless needles; M. P. 216.5–219.5° C. (melted partly at 206.5° C. to 208° C., then resolidified); there was no depression in melting point when this material was admixed with $\Delta^{17}$-3-keto-11($\beta$),21-dihydroxy-20-cyano-pregnene as prepared via the 3-diethyl ketal as described in Example 3 hereinabove.

Example 7

Five grams of $\Delta^{17}$-3-keto-11($\beta$),21-dihydroxy-20-cyano-pregnene was warmed gently with 100 ml. of acetic anhydride until the material had completely dissolved. Eight milliliters of pyridine was added to the solution, and the resulting mixture was heated at a temperature of 65° C. for a period of approximately ½ hour. The reaction mixture was cooled to room temperature, 20 ml. of water was added thereto with external cooling, and the mixture was vigorously agitated to decompose the excess acetic anhydride. The mixture thus obtained was diluted to a volume of 500 ml. with water, and the resulting suspension of crystalline material was stirred at approximately room temperature for a period of about 1 hour; the resulting suspension was then cooled to about 0° C. and stirred for about two hours at that temperature. The slurry was filtered and the crystalline product was washed with four 25 ml. portions of water, and dried at 60° C. overnight to give approximately 5.27 g. of substantially pure $\Delta^{17}$-3-keto-11($\beta$) - hydroxy - 20 - cyano - 21 - acetoxy - pregnene which was obtained in the form of colorless needles; M. P. 169–171° C. This material was repeatedly recrystallized from acetone-ether to give colorless needles of analytically pure $\Delta^{17}$-3-keto-11($\beta$)-hydroxy-20-cyano-21-acetoxy-pregnene; M. P. 170–171.5° C.;

$[\alpha]_D^{25°C} = +32.4°$
(1.02, acetone);

$\lambda_{max.}^{CH_3OH} 2230$ Å., $E_{1 cm.}^{1\%}$ 354

Analysis.—Calc'd for $C_{24}H_{33}O_4N$: C, 72.15; H, 8.33. Found: C, 71.93; H, 8.37.

Example 8

0.45 g. of $\Delta^{17}$-3-keto-11($\beta$)-hydroxy-20-cyano-21-acetoxy-pregnene, prepared as described in Example 7 hereinabove, was dissolved in 4.5 ml. of benzene containing 0.3 ml. of pyridine, 0.31 g. of osmium tetroxide was added to the solution, and the resulting mixture was allowed to stand at room temperature for a period of approximately 60 hours. (After about 6 hours crystalline material separated and could be recovered by filtration, if desired, and dried to give the 17-20 osmate ester of 3-keto-11($\beta$),17($\alpha$),20-trihydroxy-20-cyano-21-acetoxy-pregnane.) The final reaction mixture was diluted with 30 ml. of chloroform and 0.30 g. of filtercel was added to the mixture. One milliliter of concentrated aqueous hydrochloric acid was then added dropwise with stirring to the resulting suspension, and the suspension was stirred for a period of approximately four hours. The solid material was removed by filtration and washed thoroughly with hot chloroform. The filtered chloroform solution was washed once by shaking with water, and was then stirred vigorously for a period of about one hour with a solution containing 1.1 g. of potassium carbonate dissolved in 21 ml. of water. The chloroform layer was separated, washed once with 15 ml. water, dried over 4 g. of anhydrous sodium sulfate, and the dry chloroform solution filtered. The filtered chloroform solution was then evaporated in vacuo to a volume of approximately 5.5 ml.; this solution can be evaporated to dryness, if desired, to give 3,20-diketo-11($\beta$),17($\alpha$)-dihydroxy-21-acetoxy-pregnane, contaminated with a small amount of 3,20 - diketo - 11($\beta$),17($\alpha$),21 - trihydroxy-pregnane.

To the concentrated solution (volume 5.5 ml.), was added 0.11 ml. of pyridine and 0.27 ml. of acetic anhydride. The resulting solution was heated at a temperature of approximately 60–65° C. for a period of approximately one-half hour, and the reaction solution was cooled to approximately 0° C. 16 ml. of petroleum ether (B. P. 30–60° C.) was added to the cooled solution, whereupon crystalline material separated. The resulting slurry was filtered, and the crystalline material was washed twice with petroleum ether (B. P. 30–60° C.), and dried to give approximately 0.35 g. of substantially pure 3,20-diketo-11($\beta$),17($\alpha$) - dihydroxy - 21 - acetoxy - pregnane. This material was further purified by repeated recrystallization from acetone-petroleum ether (B. P. 30–60° C.) to give analytically pure 3,20 - diketo - 11($\beta$),17($\alpha$) - dihydroxy - 21-acetoxy-pregnane which was obtained as colorless prisms; M. P. 217.6–219.8° C.;

$$[\alpha]_D^{25°C.} = +86.6°$$

(1.05, acetone).

*Analysis.*—Calc'd. for $C_{23}H_{34}O_6$: C, 67.95; H, 8.43. Found: C, 68.20; H, 8.19.

*Example 9*

0.45 gram of $\Delta^{17}$ - 3 - keto - 11($\beta$) - hydroxy-20-cyano-21-acetoxy-pregnene, prepared as described in Example 7 hereinabove, was dissolved in 4.5 ml. of benzene (thiophene-free) containing 0.3 ml. of pyridine, and 0.31 g. of osmium tetroxide was added to the solution. The mixture was agitated to bring the components into solution, and the resulting solution was allowed to stand at room temperature for a period of approximately forty-eight hours; (crystallization of the 17,20-osmate ester of 3-keto-11($\beta$),17($\alpha$),20-trihydroxy - 20 - cyano - 21 - acetoxy - pregnane was noted after approximately six hours).

At the end of forty-eight hours, the reaction mixture was mixed with 21.2 cc. of water, 6.2 ml. of benzene, 14.7 ml. of methanol and an intimate mixture of 2.20 g. of potassium bicarbonate with 2.02 g. of sodium sulfite. The resulting mixture was stirred at room temperature for a period of approximately twenty hours, thereby hydrolyzing the osmate ester. The hydrolysis mixture was filtered to remove the precipitated osmium salts, and the filtered material was washed with four 25 ml. portions of hot chloroform. The filtrate and washings were combined, the layers were separated, and the aqueous phase was then evaporated in vacuo to approximately one-third its initial volume. The concentrated aqueous solution was extracted with seventeen 10 ml. portions of chloroform, and the chloroform washings and extracts were combined and dried over 10 g. of anhydrous sodium sulfate. The dry chloroform solution was then filtered and evaporated to dryness to give 3,20-diketo-11($\beta$),17($\alpha$)-dihydroxy-21-acetoxy-pregnane which was obtained as a crystalline solid, contaminated with a small amount of 3,20 - diketo - 11($\beta$),17($\alpha$),21 - trihydroxy-pregnane.

This material was dissolved in 5 ml. of acetic anhydride, 2 ml. of pyridine was added to the solution, and the resulting solution was heated at a temperature of 60–70° C. for a period of about thirty minutes. At the end of this time, the excess acetic anhydride was cautiously decomposed by adding 2.3 ml. of water to the acetylation mixture, with cooling. Thirty milliliters of water was then slowly added, with swirling, to the resulting solution, whereupon a precipitate formed. The resulting slurry was allowed to stand at a temperature of approximately 0° C. for about 1 hour, and the precipitated material was recovered by filtration. The filtered material was washed with five 10 ml. portions of water, and dried at a temperature of 60° C. to give 0.36 g. of substantially pure 3,20-diketo-11($\beta$),17($\alpha$)-dihydroxy - 21 - acetoxy - pregnane; M. P. 205–210° C.

This material was further purified by dissolving it in 15 cc. of hot acetone, treating the acetone solution for a period of 10–15 minutes with 0.08 g. of activated charcoal (Nuchar), and the resulting charcoal slurry was filtered through diatomaceous silica (Supercel). The filtered acetone solution was evaporated to a volume of 5 to 6 ml., and 70 ml. of petroleum ether (B. P. 30–60° C.) was carefully added to the concentrated acetone solution, whereupon a crystalline product separated. The slurry was allowed to stand for approximately one hour to complete crystallization, the crystalline material was recovered by filtration, washed with three 10 ml. portions of petroleum ether (B. P. 30–60° C.), and dried to give 0.29 g. of substantially pure 3,20-diketo - 11($\beta$),17($\alpha$) - dihydroxy - 21 - acetoxy-pregnane; M. P. 214–215° C.; no depression in melting point was observed when this compound was mixed with 3,20-diketo-11($\beta$),17($\alpha$)-dihydroxy - 21 - acetoxy - pregnane prepared as described in Example 8 hereinabove.

*Example 10*

One-half gram of 3,20 - diketo - 11($\beta$),17($\alpha$)-dihydroxy-21-acetoxy-pregnane was dissolved in 10 ml. of glacial acetic acid containing 0.25 ml. of 1 N hydrogen bromide in acetic acid, and to this solution was added dropwise, with stirring, over a five-minute period, a mixture of 1.13 ml. of 2.05 N bromine in acetic acid and 1.12 ml. of 1 M sodium acetate in acetic acid. The resulting mixture was stirred for an additional period of approximately 15 minutes, at the end of which time 6 ml. of water was added, dropwise, to the reaction mixture, whereupon the solution became cloudy and crystalline material separated. The resulting slurry was cooled at about 0° C. for a period of approximately four and one-half hours, and the crystalline material was recovered by filtration and dried to give 0.20 g. of 3,20-diketo-4-bromo - 11($\beta$),17($\alpha$) - dihydroxy - 21 - acetoxy-pregnane which was obtained in the form of colorless needles; M. P. 186–187° C., dec. A substantially pure sample of 3,20-diketo-4-bromo-11(β),17(α) - dihydroxy - 21 - acetoxy - pregnane, prepared substantially as described above, melted at 190.4–191.6° C. (dec.); [α]$_D^{25°C.}$=+99° (1.0, acetone).

Example 11

0.104 gram of semicarbazide hydrochloride and 0.114 g. of anhydrous sodium acetate were dissolved in 22.5 ml. of glacial acetic acid containing 0.5 ml. of water, and this solution was added to a solution containing 0.15 g. of 3,20-diketo - 4 - bromo - 11(β),17(α) - dihydroxy - 21-acetoxy-pregnane dissolved in 7.5 ml. of glacial acetic acid. The resulting mixture was heated at a temperature of about 65–67° C. in an atmosphere of nitrogen for a period of approximately two hours. The reaction mixture was cooled to room temperature, and 1.43 g. of anhydrous sodium acetate and 1.4 ml. of 90% aqueous pyruvic acid was added to the cooled mixture. The resulting mixture was then heated at a temperature of about 70–72° C. in an atmosphere of nitrogen for a period of about four hours, and was then allowed to stand at room temperature for an additional 12 hour period. Sixty milliliters of water were added to the reaction mixture, and the resulting solution was evaporated in vacuo to a volume of about 5 ml. Twenty milliliters of water were added to the concentrated solution whereupon crystalline material separated which was recovered by filtration, washed thoroughly with water, and dried to give 0.70 g. of substantially pure Δ⁴ - 3,20 - diketo - 11(β),17(α) - dihydroxy-21-acetoxy-pregnene which was obtained in the form of light, buff-colored microprisms; M. P. 208–214° C. with slight previous softening. This mixture was further purified by a single recrystallization from ethyl acetate to give analytically pure Δ⁴-3,20-diketo-11(β),17(α)-dihydroxy-21-acetoxy-pregnene which was obtained in the form of colorless prisms; M. P. 218.5–220.5° C. with slight previous softening (microblock);

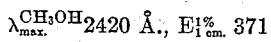

the melting point of a mixture of this material with an authentic sample of 17(α)-hydroxycorticosterone acetate showed no depression; the identity of the material prepared as described above with said authentic sample was further confirmed by comparative infra-red spectra.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting a compound having the formula:

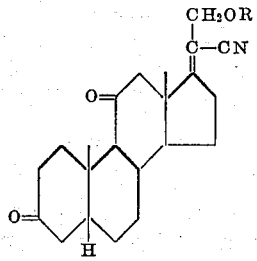

wherein R is a radical selected from the class which consists of hydrogen and acyl radicals, with a ketone reagent thereby forming the corresponding Δ¹⁷-11-keto-20-cyano-pregnene compound wherein the keto grouping in the 3-position is replaced by a substituent reconvertible to ketone by reaction with a hydrolyzing agent, reacting this compound with an alkali metal borohydride thereby converting the keto radical in the 11-position to an 11(β)-hydroxy grouping without substantially affecting the substituents attached to the 3 and 20-carbon atoms, thereby producing the corresponding Δ¹⁷-11(β)-hydroxy - 20 - cyano - pregnene compound, reacting the latter compound with a hydrolyzing agent to produce a compound of the formula:

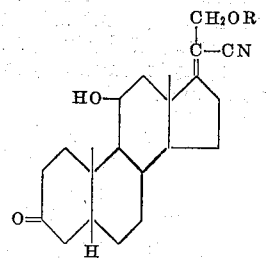

wherein R has the significance above-defined, reacting this compound with osmium tetroxide to produce a compound of the formula:

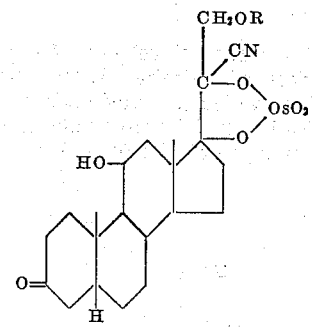

where R has the significance above-defined, reacting this compound with a hydrolyzing agent to form a compound having the formula:

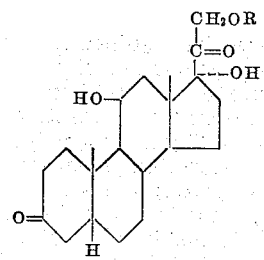

wherein R has the significance above-defined, reacting this compound with bromine to produce a compound of the formula:

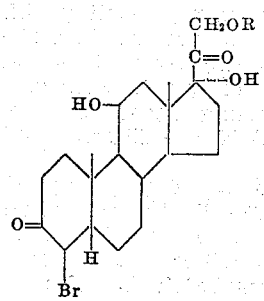

wherein R has the significance above-defined, and reacting the latter compound with a dehydrohalogenating agent to form a compound of the formula:

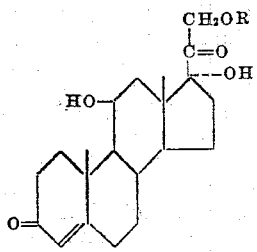

wherein R has the significance above-defined.

2. The process which comprises reacting $\Delta^{17}$ - 3,11 - diketo - 20 - cyano - 21 - hydroxypregnene with a compound selected from the class which consists of hydroxylamine, semicarbazide and arylhydrazines to produce a compound of the formula:

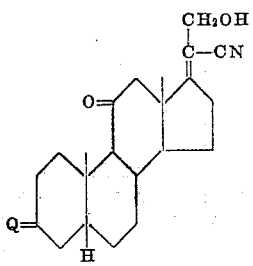

wherein Q is a radical selected from the class which consists of oximino, semicarbazido and arylhydrazino radicals, reacting this compound with an alkali metal borohydride thereby producing a compound of the formula:

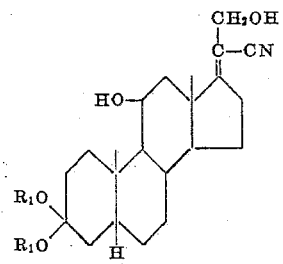

wherein Q has the significance above-defined, reacting this compound with a hydrolyzing agent to produce $\Delta^{17}$-3-keto-11($\beta$),21-dihydroxy-20-cyano-pregnene, reacting said $\Delta^{17}$-3-keto - 11($\beta$),21 - dihydroxy - 20 - cyano - pregnene with an acylating agent to form $\Delta^{17}$-3-keto - 11($\beta$) - hydroxy - 20 - cyano - 21 - acyloxy-pregnene, reacting the latter compound with osmium tetroxide to produce the 17,20-osmate ester of 3-keto-11($\beta$),17($\alpha$),20-trihydroxy-20-cyano-21-acyloxy-pregnane, reacting this osmate ester with a hydrolyzing agent to form 3,20 - diketo - 11($\beta$),17($\alpha$) - dihydroxy-21-acyloxy-pregnane, reacting this compound with bromine to produce 3,20-diketo-4-bromo-11($\beta$),17($\alpha$) - dihydroxy - 21 - acyloxy - pregnane, and reacting this compound with a dehydrohalogenating agent to produce $\Delta^4$-3,20-diketo - 11($\beta$),17($\alpha$) - dihydroxy - 21 - acyloxy-pregnene.

3. The process of preparing $\Delta^4$-3,20-diketo-11($\beta$), 17($\alpha$),21-trihydroxy-pregnene which comprises reacting an alkyl orthoformate with $\Delta^{17}$-3,11-diketo-20-cyano-21-hydroxy-pregnene to form a compound of the formula:

wherein $R_1$ is an alkyl radical, reacting this compound with an alkali metal borohydride thereby producing a compound of the formula:

wherein $R_1$ has the significance above-defined, reacting the latter compound with a hydrolyzing agent to produce $\Delta^{17}$-3-keto-11($\beta$),21-dihydroxy-20-cyano-pregnene, reacting said $\Delta^{17}$-3-keto-11($\beta$),21-dihydroxy-20-cyano-pregnene with an acylating agent to form $\Delta^{17}$-3-keto-11($\beta$)-hydroxy - 20 - cyano - 21 - acyloxy - pregnene, reacting the latter compound with osmium tetroxide to produce the 17,20-osmate ester of 3-keto-11($\beta$),17($\alpha$),20 - trihydroxy - 20 - cyano - 21-acyloxy-pregnane, reacting this osmate ester with a hydrolyzing agent to form 3,20 - diketo - 11($\beta$),17($\alpha$) -dihydroxy-21-acyloxy-pregnane, reacting this compound with bromine to produce 3,20 - diketo - 4 - bromo - 11($\beta$),17($\alpha$) - dihydroxy-21-acyloxy-pregnane, reacting this compound with a dehydrohalogenating agent to form $\Delta^4$ - 3,20 - diketo - 11($\beta$),17($\alpha$) - dihydroxy - 21-acyloxy-pregnene, and reacting this compound with a hydrolyzing agent.

4. The process which comprises reacting $\Delta^{17}$ - 3,11 - diketo - 20 - cyano - 21 - hydroxypregnene with semicarbazide to produce $\Delta^{17}$-3-semicarbazido - 11 - keto - 20 - cyano - 21 - hydroxy-pregnene, reacting this compound with lithium borohydride thereby producing $\Delta^{17}$-3-semicarbazido - 11($\beta$),21 - dihydroxy - 20 - cyano-pregnene, reacting the latter compound with a hydrolyzing agent comprising aqueous pyruvic acid to produce $\Delta^{17}$-3-keto-11($\beta$),21-dihydroxy-20-cyano-pregnene, reacting said $\Delta^{17}$-3-keto-11($\beta$),21-dihydroxy-20-cyano-pregnene with acetic anhydride to produce $\Delta^{17}$-3-keto-11($\beta$)-hydroxy - 20 - cyano - 21 - acetoxy - pregnene, reacting the latter compound with osmium tetroxide to form the 17,20-osmate ester of 3-keto-11($\beta$),17,20 - trihydroxy - 20 - cyano - 21 - acetoxy-pregnane, reacting said osmate ester with aqueous sodium sulfite to produce 3,20-diketo-11($\beta$),17($\alpha$)-dihydroxy-21-acetoxy-pregnane, reacting this compound with bromine to form 3,20-diketo - 4 - bromo - 11($\beta$),17($\alpha$) - dihydroxy - 21-acetoxy-pregnane, and reacting this compound with semicarbazide followed by aqueous pyruvic acid to produce $\Delta^4$-3,20-diketo-11($\beta$),17($\alpha$)-dihydroxy-21-acetoxy-pregnane.

5. The process which comprises reacting $\Delta^{17}$-3,11-diketo-20-cyano-21-hydroxy-pregnene with ethyl orthoformate to produce $\Delta^{17}$-3,3-diethoxy-11-keto-20-cyano-21-hydroxy-pregnene, reacting this compound with sodium borohydride, thereby producing $\Delta^{17}$-3,3-diethoxy-11($\beta$),21-dihydroxy-20-cyano-pregnene, reacting the latter compound with aqueous hydrochloric acid to produce $\Delta^{17}$-3-keto-11($\beta$),21-dihydroxy-20-cyano-pregnene, reacting said $\Delta^{17}$-3-keto-11($\beta$),21-dihydroxy-20-cyano-pregnene with acetic anhydride to produce $\Delta^{17}$ - 3 - keto - 11($\beta$) - hydroxy - 20 - cyano - 21-acetoxy-pregnene, reacting the latter compound with osmium tetroxide to form the 17,20-osmate ester of 3-keto-11($\beta$),17,20-trihydroxy-20-cyano-21-acetoxy-pregnane, reacting said osmate ester with aqueous sodium sulfite to produce 3,20-diketo - 11($\beta$),17($\alpha$) - dihydroxy - 21 - acetoxy-pregnane, reacting this compound with bromine to form 3,20-diketo-4-bromo-11($\beta$),17($\alpha$)-dihydroxy-21-acetoxy-pregnane, and reacting this compound with semicarbazide followed by aqueous pyruvic acid to produce $\Delta^4$-3,20-diketo-11($\beta$),17($\alpha$)-dihydroxy-21-acetoxy-pregnene.

6. The process which comprises reacting $\Delta^{17}$-3,11-diketo-20-cyano-21-hydroxy-pregnene with ethyl orthoformate to produce $\Delta^{17}$-3,3-diethoxy-11-keto-20-cyano-21-hydroxy-pregnene, reacting this compound with lithium borohydride, thereby producing $\Delta^{17}$-3,3-diethoxy-11($\beta$),21-dihydroxy-20-cyano-pregnene, reacting the latter compound with aqueous hydrochloric acid to produce $\Delta^{17}$-3 - keto - 11($\beta$),21 - dihydroxy - 20 - cyano - pregnene, reacting said $\Delta^{17}$-3-keto-11($\beta$),21-dihydroxy-20-cyano-pregnene with acetic anhydride to produce $\Delta^{17}$-3-keto-11($\beta$)-hydroxy-20-cyano-21-acetoxy-pregnene, reacting the latter compound with osmium tetroxide to form the 17,20-osmate ester of 3-keto-11($\beta$),17,20-trihydroxy-20-cyano-21-acetoxy-pregnane, reacting said osmate ester with aqueous sodium sulfite to produce 3,20-diketo - 11($\beta$),17($\alpha$) - dihydroxy - 21 - acetoxy-pregnane, reacting this compound with bromine to form 3,20-diketo-4-bromo-11($\beta$),17($\alpha$)-dihydroxy-21-acetoxy-pregnane, and reacting this compound with semicarbazide followed by aqueous pyruvic acid to produce $\Delta^4$-3,20-diketo-11($\beta$),17($\alpha$)-dihydroxy-21-acetoxy-pregnane.

7. Compounds of the formula:

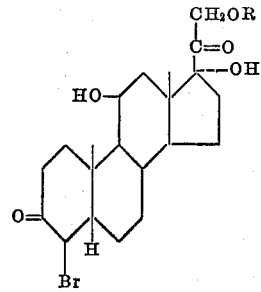

wherein R is a radical selected from the class which consists of hydrogen and lower alkanoyl radicals.

8. 3,20 - diketo - 4 - bromo - 11($\beta$),17($\alpha$) - dihydroxy-21-acetoxy-pregnane.

ROBERT P. GRABER.
NORMAN L. WENDLER.

References Cited in the file of this patent

UNITED STATES PATENTS

| Number | Name | Date |
|---|---|---|
| 2,345,711 | Marker | Apr. 4, 1944 |
| 2,541,104 | Sarett | Feb. 13, 1951 |
| 2,541,105 | Sarett | Feb. 13, 1951 |
| 2,541,106 | Sarett | Feb. 13, 1951 |
| 2,590,978 | Kendall | Apr. 1, 1952 |

OTHER REFERENCES

Nystrom: Jour. Am. Chem. Soc. 69, 1197–1199 (1947).

Chaikin et al.: Jour. Am. Chem. Soc. 71, 122–125 (1949).